United States Patent
Zhao et al.

(10) Patent No.: US 10,580,371 B2
(45) Date of Patent: Mar. 3, 2020

(54) DATA DRIVING MODULE FOR DRIVING DISPLAY PANEL, DATA DRIVING METHOD AND DISPLAY DEVICE

(71) Applicants: BOE Technology Group Co., Ltd., Beijing (CN); Hefei Xinsheng Optoelectronics Technology Co., Ltd., Anhui (CN)

(72) Inventors: Jian Zhao, Beijing (CN); Long Yan, Beijing (CN)

(73) Assignees: BOE TECHNOLOGY GROUP CO., LTD., Beijing (CN); HEFEI XINSHENG OPTOELECTRONICS TECHNOLOGY CO., LTD., Anhui (CN)

( * ) Notice: Subject to any disclaimer, the term of this patent is extended or adjusted under 35 U.S.C. 154(b) by 278 days.

(21) Appl. No.: 15/514,629

(22) PCT Filed: Sep. 14, 2016

(86) PCT No.: PCT/CN2016/098955
§ 371 (c)(1),
(2) Date: Mar. 27, 2017

(87) PCT Pub. No.: WO2017/059761
PCT Pub. Date: Apr. 13, 2017

(65) Prior Publication Data
US 2017/0330521 A1    Nov. 16, 2017

(30) Foreign Application Priority Data
Oct. 9, 2015    (CN) .......................... 2015 1 0649530

(51) Int. Cl.
*G09G 3/36*    (2006.01)
*G02F 1/1335*    (2006.01)
(Continued)

(52) U.S. Cl.
CPC ....... *G09G 3/3611* (2013.01); *G02F 1/13452* (2013.01); *G02F 1/13454* (2013.01);
(Continued)

(58) Field of Classification Search
CPC ............... G09G 3/3611; G09G 3/3688; G09G 2320/0276; G09G 3/3696; G09G 3/3275;
(Continued)

(56) References Cited

U.S. PATENT DOCUMENTS 6,856,309 B2 *  2/2005  Chang .................. G09G 3/3688
                                                         345/100
8,791,893 B2    7/2014  Liao et al.
(Continued)

FOREIGN PATENT DOCUMENTS

| CN | 1315011 A | 9/2001 |
| CN | 102402957 A | 4/2012 |

(Continued)

OTHER PUBLICATIONS

Second Office Action for Chinese Patent Application No. 201510649530.3 dated Nov. 1, 2017.
(Continued)

*Primary Examiner* — Carolyn R Edwards
(74) *Attorney, Agent, or Firm* — Calfee, Halter & Griswold LLP

(57) ABSTRACT

A data driving module includes: a driving signal generating module, configured to generate a source driving voltage signal for driving a target sub-pixel, the source driving voltage signal being capable of writing a target driving voltage signal to the target sub-pixel after being transmitted to the target sub-pixel through a transmitting path, to operate the target sub-pixel under an operation gray scale, a difference between the operation gray scale and a target gray scale of the sub-pixel being smaller than a predetermined thresh-
(Continued)

old, wherein the output interface is configured to receive and output the source driving voltage signal generated by the driving signal generating module.

18 Claims, 9 Drawing Sheets

(51) Int. Cl.
  *G02F 1/1343* (2006.01)
  *G02F 1/1345* (2006.01)
  *G09G 3/3275* (2016.01)

(52) U.S. Cl.
  CPC .. *G02F 1/133615* (2013.01); *G02F 1/134336* (2013.01); *G09G 3/3688* (2013.01); *G09G 3/3275* (2013.01); *G09G 3/3696* (2013.01); *G09G 2320/0276* (2013.01)

(58) Field of Classification Search
  CPC ........... G02F 1/133615; G02F 1/13454; G02F 1/13452; G02F 1/134336
  See application file for complete search history.

(56) References Cited

U.S. PATENT DOCUMENTS

| | | | | |
|---|---|---|---|---|
| 9,240,154 | B2 | 1/2016 | Park et al. | |
| 9,275,594 | B2* | 3/2016 | Zhu | G09G 3/3685 |
| 9,390,680 | B2* | 7/2016 | Jeon | G09G 5/10 |
| 2001/0022570 | A1* | 9/2001 | Chang | G09G 3/3688 |
| | | | | 345/98 |
| 2006/0186913 | A1* | 8/2006 | Kim | G09G 3/006 |
| | | | | 324/760.02 |
| 2007/0242019 | A1* | 10/2007 | Jung | G09G 3/3688 |
| | | | | 345/98 |
| 2008/0001897 | A1* | 1/2008 | Lim | G09G 3/3688 |
| | | | | 345/98 |
| 2010/0259516 | A1* | 10/2010 | Park | G09G 3/3648 |
| | | | | 345/204 |
| 2012/0098813 | A1* | 4/2012 | Park | G09G 3/3611 |
| | | | | 345/211 |
| 2013/0120344 | A1* | 5/2013 | Liao | G09G 5/00 |
| | | | | 345/212 |
| 2013/0141401 | A1* | 6/2013 | Kang | G09G 3/3688 |
| | | | | 345/204 |
| 2013/0141403 | A1* | 6/2013 | Shibuya | H03K 5/15 |
| | | | | 345/204 |
| 2013/0249969 | A1 | 9/2013 | Jeon et al. | |
| 2014/0292731 | A1 | 10/2014 | Zhu et al. | |
| 2016/0247483 | A1* | 8/2016 | Jang | G09G 3/3648 |

FOREIGN PATENT DOCUMENTS

| | | |
|---|---|---|
| CN | 102402963 A | 4/2012 |
| CN | 102456331 A | 5/2012 |
| CN | 103165095 A | 6/2013 |
| CN | 103325349 A | 9/2013 |
| CN | 103426409 A | 12/2013 |
| CN | 103572246 A | 2/2014 |
| CN | 104299960 A | 1/2015 |
| CN | 105118423 A | 12/2015 |
| CN | 105572938 A | 5/2016 |
| EP | 2642478 A2 | 9/2013 |
| EP | 2692896 A1 | 2/2014 |
| JP | 08146371 A | 6/1996 |
| JP | 2000182914 A | 6/2000 |
| JP | 2001075108 A | 3/2001 |

OTHER PUBLICATIONS

International Search Report and Written Opinion for International Application No. PCT/CN2016/098955 dated Nov. 30, 2016.
First Office Action for Chinese Patent Application No. 201510649530.3 dated Mar. 2, 2017.

* cited by examiner

DATA DRIVING MODULE FOR DRIVING DISPLAY PANEL, DATA DRIVING METHOD AND DISPLAY DEVICE

CROSS REFERENCE

The present application is based upon International Application No. PCT/CN2016/098955, filed on Sep. 14, 2016, which is based upon and claims priority to Chinese Patent Application No. 201510649530.3, filed on Oct. 9, 2015, and the entire contents thereof are incorporated herein by reference.

TECHNICAL FIELD

The present disclosure relates to the field of display technology, in particular, to a data driving module for driving a display panel, a data driving method and a display device.

BACKGROUND

There are various display panels currently available, such as a liquid display panel, an LED display panel, and an OLED display panel. All of which need to provide a data driving signal to a display panel from a data driving module, such that the display panel may be driven to display images.

An impedance difference, either significant or negligible, exits between data signal transmitting lines corresponding to each column of sub-pixels. Such impedance difference may be caused by a length difference between the transmitting paths, local unevenness of the manufacturing process or the like. The impedance difference may lead to display abnormality. While the display panel has an increasing size, each data module shall provide a data signal to an increasing region, such that the impedance difference becomes greater and thus causing more significant display abnormality.

In the prior art, in order to address the display abnormality caused by the impedance difference, a length difference between transmitting paths in the peripheral area may be reduced. However, the above method is limited by manufacturing processes as it depends upon the manufacturing processes.

It should be noted that, information disclosed in the above background portion is provided only for better understanding of the background of the present disclosure, and thus it may contain information that does not form the prior art known by those ordinary skilled in the art.

SUMMARY

One objective of embodiments of the present disclosure lies in providing a data driving module for driving a display panel, a data driving method, and a display device, and improving the display abnormality due to an impedance difference in view of data driving.

For the above objective, embodiments of the present disclosure provide a data driving module for driving a display panel, the data driving module including at least an output interface, connected to a sub-pixel in the display panel through a data signal transmitting line, and the data driving module including: a driving signal generating module, configured to generate a source driving voltage signal for driving a target sub-pixel, the source driving voltage signal being capable of writing a target driving voltage signal to the target sub-pixel after being transmitted to the target sub-pixel through a transmitting path, to operate the target sub-pixel under an operation gray scale, a difference between the operation gray scale and a target gray scale of the sub-pixel being smaller than a predetermined threshold; and the at least one output interface, configured to receive and output the source driving voltage signal generated by the driving signal generating module.

For the above objective, embodiments of the present disclosure further provide a display device, including the above data driving modules.

For the above objective, embodiments of the present disclosure further provide a data driving method for driving a display panel comprising a data driving module, the data driving module includes at least one output interface connected to a sub-pixel in the display panel through a data signal transmitting line, and the data driving method including:

a driving signal generating step, configured to generate a source driving voltage signal for driving a target sub-pixel, the source driving voltage signal being capable of writing a target driving voltage signal to the target sub-pixel after being transmitted to the target sub-pixel through a transmitting path, to operate the target sub-pixel under an operation gray scale, a difference between the operation gray scale and a target gray scale of the sub-pixel being smaller than a predetermined threshold; and an output step, configured to output the source driving voltage signal through the output interface.

It is to be understood that both the foregoing general description and the following detailed description are exemplary and explanatory only and are not restrictive of the invention, as claimed.

This section provides a summary of various implementations or examples of the technology described in the disclosure, and is not a comprehensive disclosure of the full scope or all features of the disclosed technology.

DETAILED DESCRIPTION

Figure 1:
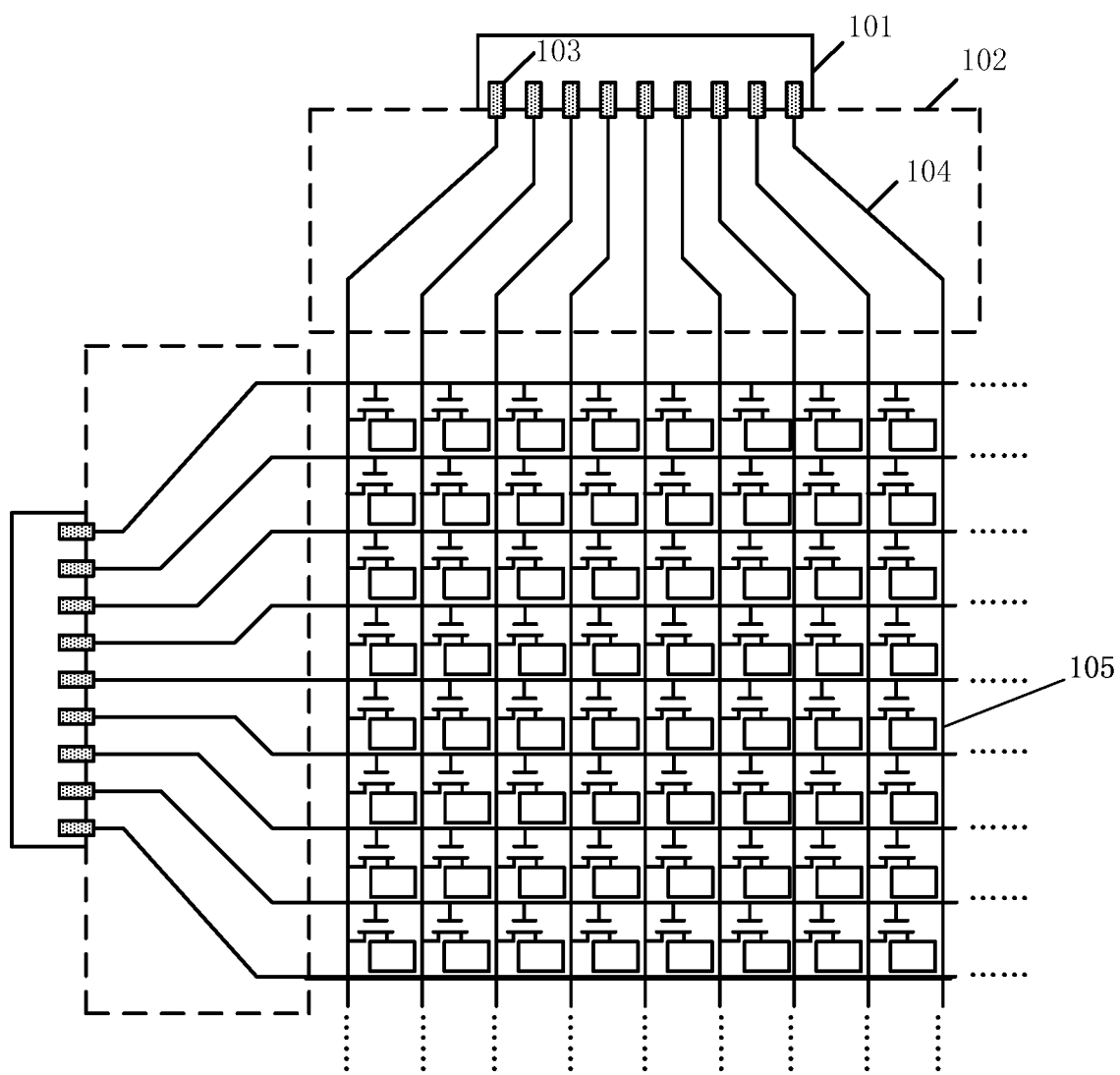
FIG. 1 illustrates a schematic view of a display panel according to at least one embodiment of the present disclosure.

In order to drive a display panel, generally, a data driving module 101 is disposed in a non-display region of the panel. Each data driving module 101 corresponds to a plurality of data signal transmitting lines. As illustrated in FIG. 1, the data driving module 101 is connected to a sub-pixel column in the display panel through the data signal transmitting line. The data signal transmitting line comprises two portions of a first portion 104 in a fan-out region 102 and a second portion 105 in a display region. In other words, a path transmitting the signal from an output interface 103 to a TFT includes the first portion 104 in the fan-out region 102 and a second portion 105 in the display region.

In the data driving module for driving a display panel, method and display device according to embodiments of the present disclosure, while generating a driving voltage signal for a sub-pixel, the transmitting path between the output interface and the sub-pixel may be taken into consideration, such that the generated driving voltage signal is capable of allowing the target sub-pixel to operate under the operation gray scale after being transmitted through the transmitting path having an impedance, thereby improving the display abnormality between the sub-pixels due to the impedance difference between the paths.

Figure 2:
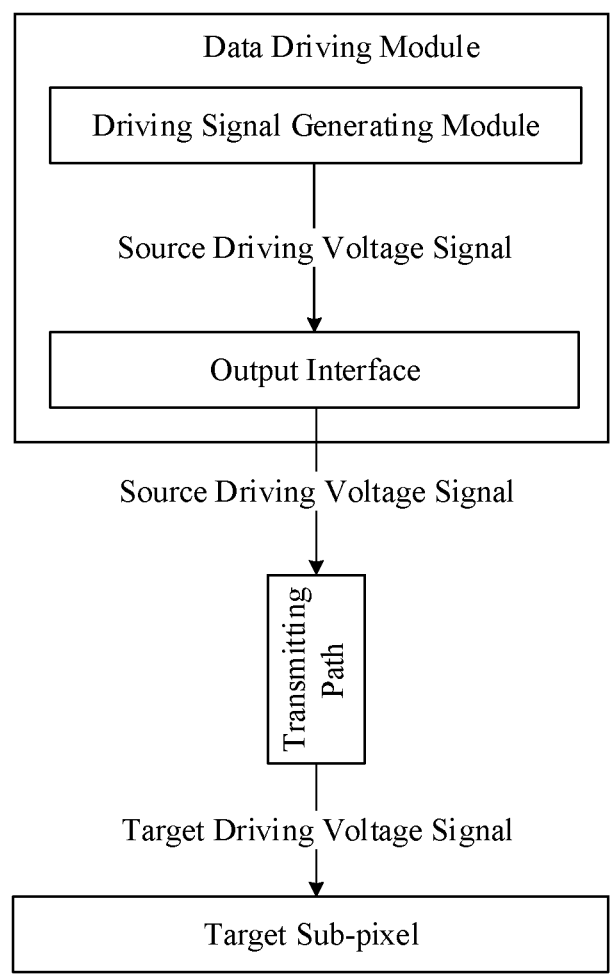
FIG. 2 illustrates a structural schematic view of a data driving module according to at least one embodiment of the present disclosure.

In the data driving module for driving a display panel according to at least one embodiment of the present disclosure, the data driving module comprises at least one output interface connected to a sub-pixel in the display panel through a data signal transmitting line. As illustrated in FIG. 2, the data driving module according to the first embodiment of the present disclosure includes:

a driving signal generating module, configured to generate a source driving voltage signal for driving a target sub-pixel, the source driving voltage signal being capable of writing a target driving voltage signal to the target sub-pixel after being transmitted to the target sub-pixel through a transmitting path, to operate the target sub-pixel under an operation gray scale, a difference between the operation gray scale and a target gray scale of the sub-pixel being smaller than a predetermined threshold; and the output interface is configured to receive and output the source driving voltage signal generated by the driving signal generating module.

After being generated and output through the output interface, the source driving voltage signal is written into a pixel electrode of the sub-pixel after passing successively through the data signal transmitting line in the periphery region, the data signal transmitting line in the display region, and the thin film transistor. With respect to the sub-pixels in a same column, the length of their data signal transmitting line through the display region is different. With respect to the sub-pixels in a same row, the length of their data signal transmitting line through the periphery region is different. In addition, the difference does not only exist in length, but also in a manufacturing process.

Accordingly, due to the impedance difference of the transmitting path, different sub-pixels may perform differently under the driving of the same source driving voltage signal. This different performance may cause some of the various display abnormality.

In a particular embodiment of the present disclosure, while the driving signal generating module is generating the source driving voltage signal, the transmitting path from respective different output interfaces of each sub-pixel to the sub-pixel may be taken into consideration, the generated source driving voltage signal may be capable of allowing the target sub-pixel to operate under the operation gray scale while being transmitted to the target sub-pixel through the transmitting path having an impedance, thereby improving the display abnormality between the sub-pixels due to the impedance difference between the paths.

In a particular embodiment of the present disclosure, the above predetermined threshold may be configured flexibly according to a quality request or the like of the display panel. The predetermined threshold may be configured to be smaller under a higher quality request, and otherwise may be configured to be relative larger, which will not be described in further detail herein.

As can be seen from the above analyses, different sub-pixels may perform differently under the driving of the same source driving voltage signal. One possible cause of the different performance may lie in: different sub-pixels may have different charge levels (i.e., the degree to which the sub-pixel is charged) under the driving of the same source driving voltage signal.

In a particular embodiment of the present disclosure, after being transmitted to the target sub-pixel through the transmitting path, the generated source driving voltage signal may be capable of writing into the target sub-pixel a target driving voltage signal allowing the target sub-pixel to operate under the operation gray scale.

With respect to different sub-pixels, in the case of the same source driving voltage signal, as the impedance of the corresponding transmitting path increases, the charge level of the sub-pixel charged by the source driving voltage signal degreases. While in view of the source driving voltage signal itself, as the impedance of the transmitting path increases, the charging ability thereof decreases.

Accordingly, if it is required that the source driving voltage signal may have a desired driving ability after passing through the transmitting path, a certain compensation is required to compensate the loss of charging ability due to the impedance of the transmitting path.

The charging ability may be increased according to the following two aspects: the charging time and the charging voltage, which will be described as follow.

Figure 3:
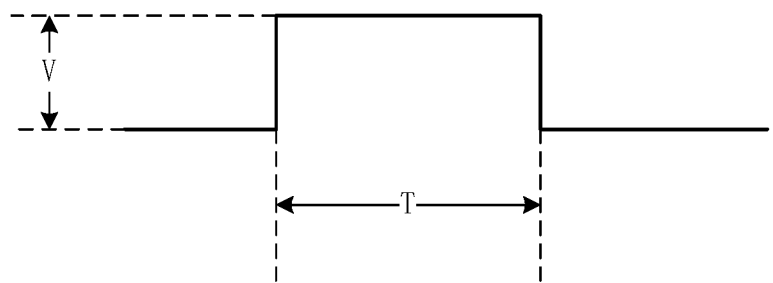
FIG. 3 illustrates a schematic view of a data driving signal according to at least one embodiment of the present disclosure.

As illustrated in FIG. 3, with respect to one sub-pixel, the generated source driving voltage signal is a pulse signal including two parameters as illustrated in FIG. 3, i.e., a signal amplitude V and a pulse width T. In this embodiment, a greater V represents a stronger input excitation, thereby having a corresponding higher charging ability. A greater T represents a longer charging time, thereby having a corresponding higher charging ability.

Accordingly, with respect to a certain sub-pixel, when its corresponding transmitting path has a relative higher impedance, the loss of the charging ability due to the impedance of the transmitting path may be compensated by increasing the voltage amplitude and/or the pulse width of the source driving voltage signal, such that the source driving voltage signal may be capable of allowing the target sub-pixel to operate under the target gray scale after being transmitted to the target sub-pixel through the transmitting path.

In other words, in a particular embodiment of the present disclosure, in the case where the transmitting path between the target sub-pixel to be driven currently and the output interface has a relative higher impedance, the signal amplitude of the source driving voltage signal may be increased, and/or the pulse width of the source driving voltage signal may be increased.

Figure 4:
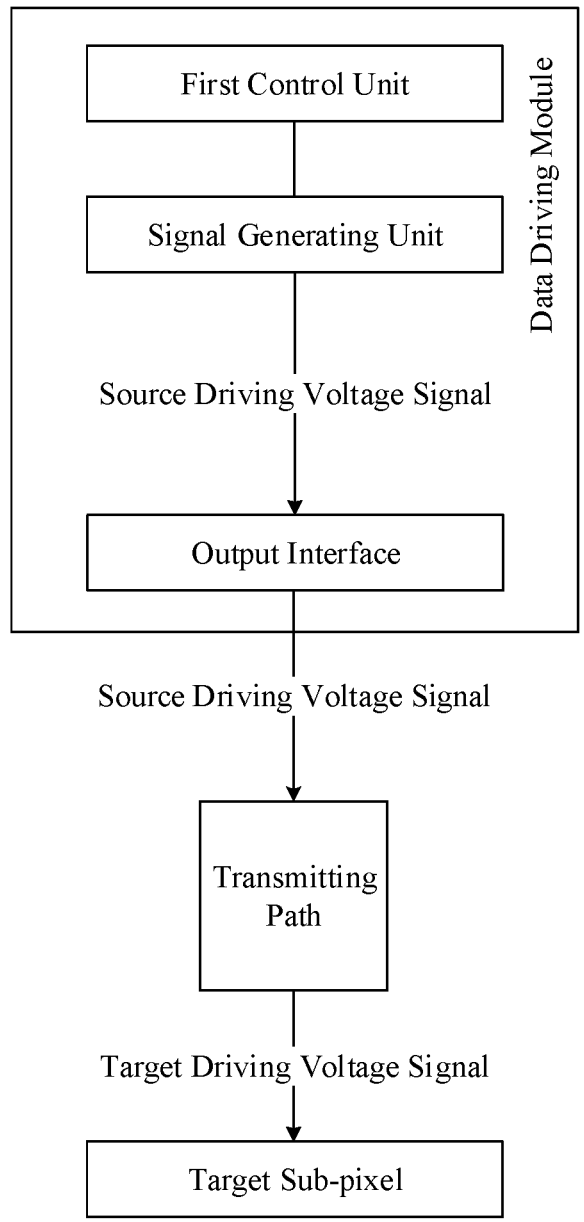
FIG. 4 illustrates a structure schematic view of a data driving module according to at least one embodiment of the present disclosure.

In at least one embodiment of the present disclosure, it is possible to ensure that the source driving voltage signal has a desired driving ability after passing through the transmitting path by controlling a signal width (i.e., a pulse width). As illustrated in FIG. 4, the data driving module according to the embodiment of the present disclosure includes:

a signal generating unit, configured to generate the source driving voltage signal; and a first control unit, configured to control the signal generating unit such that the source driving voltage signal has a signal amplitude equal to that of the target driving voltage signal, and a signal width of the source driving voltage signal matches the transmitting path, such that it is capable of writing the target driving voltage signal to the target sub-pixel after being transmitted to the target sub-pixel through the transmitting path, to operate the target sub-pixel under the operation gray scale, the difference between the operation gray scale and the target gray scale of the sub-pixel being smaller than the predetermined threshold.

The signal width of the source driving voltage signal may be controlled in various ways. In a particular embodiment of the present disclosure, the first control unit may control the signal width of the source driving voltage signal using a timing control signal. That is, the first control unit in particular includes:

a timing control signal generating unit, configured to generate a timing control signal corresponding to an impedance of the signal transmitting path, and output the timing control signal to the signal generating unit.

The signal generating unit is in particular configured to generate the source driving voltage signal using the timing control signal. The signal width of the source driving voltage signal matches the transmitting path.

Figure 5:
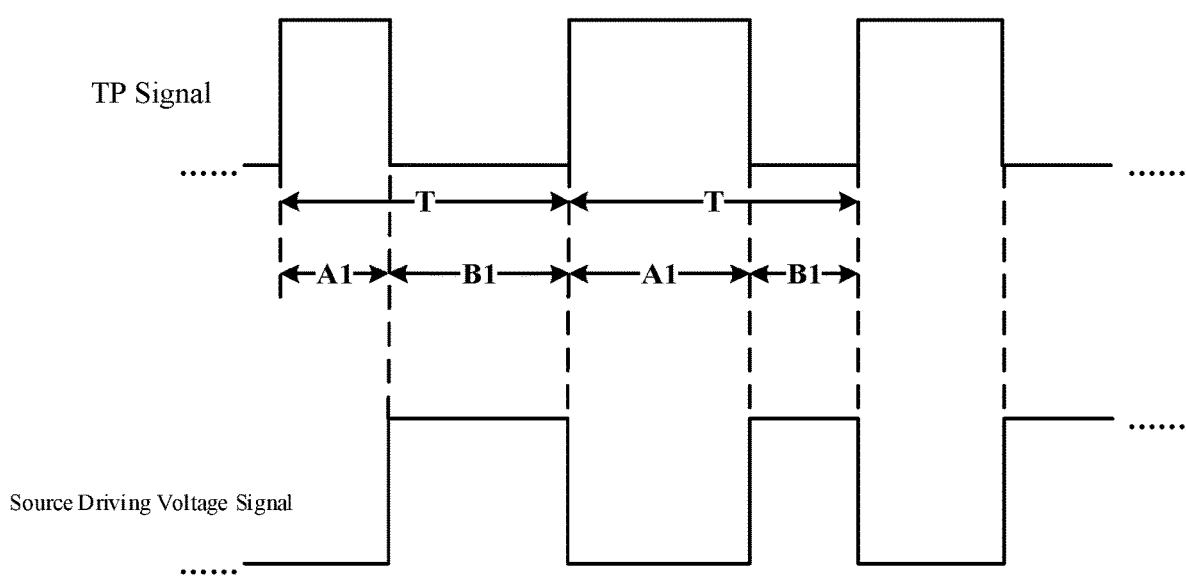
FIG. 5 illustrates a schematic view of a data driving signal controlled by a TP signal according to embodiments of the present disclosure.

In the embodiment of the present disclosure, the timing control signal may be a TP signal output from a timing controller TCON. The signal width of the source driving voltage signal may be controlled using the TP signal. As illustrated in FIG. 5, the TP signal includes the parameters that follow:

T, a period of the TP signal, or in other words, the signal width of the TP signal;

A, a duration of the high level signal, or in other words, the signal width of the high level signal; and B, a duration of the low level signal, or in other words, the signal width of the low level signal.

Referring to FIG. 5, it can be seen that under the control of the TP signal. Output of the source driving voltage signal begins at a falling edge of the high level signal and ends at a raising edge of the low level signal. That is, the source driving voltage signal has a signal width equal to that of the low level signal.

Accordingly, in a particular embodiment of the present disclosure, the signal width of the source driving voltage signal may be controlled by adjusting the parameter B of the TP signal.

Accordingly, in a particular embodiment of the present disclosure, the signal width of the source driving voltage signal may be controlled by adjusting the parameter B. Further, adjustment of the parameter B may include the following cases:

i) adjusting the parameter B, changing the parameter A accordingly and maintaining the parameter T constant; and ii) adjusting the parameter B, maintaining the parameter A constant and changing the parameter T accordingly.

However, the period of the TP signal needs to coincide with the timing of the gate driving signal. In order to reduce the implementation complexity, in the data driving module according to at least one embodiment of the present disclosure, a sum of the parameters A and B is a constant value. The timing control signal generating unit adjusts a ratio between the parameter A and the parameter B (i.e., the duty ratio of the timing control signal) according to the impedance of the signal transmitting path, such that the signal generating unit may generate the source driving voltage signal having a signal width that matches the transmitting path using the timing control signal corresponding to the impedance of the signal transmitting path.

It should be noted that said "a sum of the parameters A and B is a constant value" may have the following two levels of means:

i) during the processing of one frame signal, with respect to different sub-pixels, the timing control signal output from the timing control signal generating unit has a constant signal width; and/or ii) during the signal processing of different frames, the timing control signal output from the timing control signal generating unit to a same sub-pixel has a constant signal width.

In a particular embodiment of the present disclosure, the timing control signal generated by the timing control signal generating unit corresponds to the impedance of the signal transmitting path. With respect to a same target gray scale, as the impedance of the signal transmitting path increases, the parameter B of the timing control signal increases, so as to increase the signal width of the source driving voltage signal generated by the signal generating unit.

In a particular embodiment of the present disclosure, the above scheme may be performed with respect to each sub-pixel, which will be described hereinafter.

In the embodiment of the present disclosure, in the case of performing the above scheme on each sub-pixel, for each target gray scale of each sub-pixel, the method may include the following steps: obtaining the signal amplitude of the target driving voltage signal; determining the signal amplitude of the source driving voltage signal to be equal to the amplitude of the target driving voltage signal; and under such a signal amplitude, measuring the signal width of the source driving voltage signal capable of allowing the sub-pixel to operate under the operation gray scale. Accordingly, the parameters A and B of the TP signal may be determined according to the signal width.

Various other schemes to obtain proper values of the parameters A and B are readily available to those skilled in the art, which will not be repeated herein.

Once the parameters A and B for each target gray scale of each sub-pixel are selected, the correspondence among the following three items may be stored: the target sub-pixel, the target gray scale, and the corresponding values of the parameters A and B.

During an actual display process, when the sub-pixel and the target gray scale are determined, the corresponding values of the parameters A and B may be retrieved to generate a proper TP signal. The TP signal is sent to the control signal generating unit such that the generated source driving voltage signal has a signal width that matches the transmitting path.

When the source driving voltage signal having the signal amplitude equal to the amplitude of the target driving voltage signal and the signal width matching the transmitting path is transmitted to the sub-pixel through the transmitting path, it is able to write in the sub-pixel a target driving voltage signal capable of allowing the target sub-pixel to operate under the operation gray scale.

According to the above scheme, one set of parameters A and B is stored for each gray scale of each sub-pixel, and thus it is able to optimize the compensation for the impedance difference. However, it requires a large amount of data storage and costs a lot of processing resources and a relative long time to search for the right parameters A and B for the target gray scale of the sub-pixel.

In a particular embodiment of the present disclosure, in order to increase the response speed, it is possible to compensate only the first portion 104 (as illustrated in FIG. 1) of the data signal transmitting line in the fan-out region 102.

In this case, the compensation processing may be performed by grouping the plurality of output interfaces of each data driving module into M interface sets, wherein M is an integer equal to or greater than 2.

It is assumed that a data driving module corresponds to the output interfaces having a total number of N1+N2+N3+N4+N5. Each output interface is connected to the data signal transmitting line in the display region through the data signal transmitting line in the fan-out region, wherein N1, N2, N3, N4, N5 are integers. In this case, the output interfaces are numbered after sequencing the output interfaces in an increased order according to the length of the data signal transmitting line in the fan-out region, and then the output terminals are grouped into the following five sets.

Set 1: 1, 2, . . . , N1, i.e., from No. 1 to No. N1;
Set 2: N1+1, N1+2, . . . , N1+N2, i.e., from No. N1+1 to No. N1+N2;
Set 3: N1+N2+1, N1+N2+2, N1+N2+N3, i.e., from No. N1+N2+1 to No. N1+N2+N3 ;
Set 4: N1+N2+N3+1, N1+N2+N3+2, . . . , N1+N2+N3+N4, i.e., from No. N1+N2+N3+1 to No. N1+N2+N3+N4;
Set 5: N1+N2+N3+N4+1, N1+N2+N3+N4+2, . . . , N1+N2+N3+N4+N5, i.e., from No. N1+N2+N3+N4+1 to No. N1+N2+N3+N4+N5.

Each output interface belongs to and only to one set. Between any two of the above sets, a maximum value of a length of a data signal transmitting line in the fan-out region corresponding to one output interface set is smaller than a minimum value of a length of a data signal transmitting line in the fan-out region corresponding to the other output interface set.

As the portion of the data signal transmitting line in the display region corresponding to each output interface has exactly the same length, the impedance of the data signal transmitting line in the display region is also the same. Accordingly, between any two of the output interface sets, in view of the impedance, it can be described that a maximum value of an impedance of a data signal transmitting line corresponding to one output interface set is smaller than a minimum value of an impedance of a data signal transmitting line corresponding to the other output interface set.

In the present embodiment, in the case of being grouped into the above sets, the first control unit assigns one same signal width for the source driving voltage signal corresponding to all the output interfaces in a same output interface set. A greater signal width is assigned to the source driving voltage signal corresponding to the output interface set corresponding to data signal transmitting lines with a higher average impedance (or in other words, the average length of the data signal transmitting lines corresponding to the output interface set), so as to compensate the impedance difference due to the length difference of the data signal transmitting lines in the fan-out region corresponding to the output interface set.

In this case, for each driving module, M sets of the parameters A and B may be configured as follow:

|  | Set 1 | Set 2 | . . . | Set M |
| --- | --- | --- | --- | --- |
| TP signal parameters | A1 B1 | A2 B2 | . . . . . . | Am Bm |

In an actual display process, after a sub-pixel is selected, it is possible to determine the output interface set corresponding to the column in which the sub-pixel is positioned, and to retrieve the values of the parameters A and B corresponding to the output interface set to generate a proper TP signal, thereby controlling the signal generating unit such that the generated source driving voltage signal has a signal width matching the transmitting path.

Figure 6:
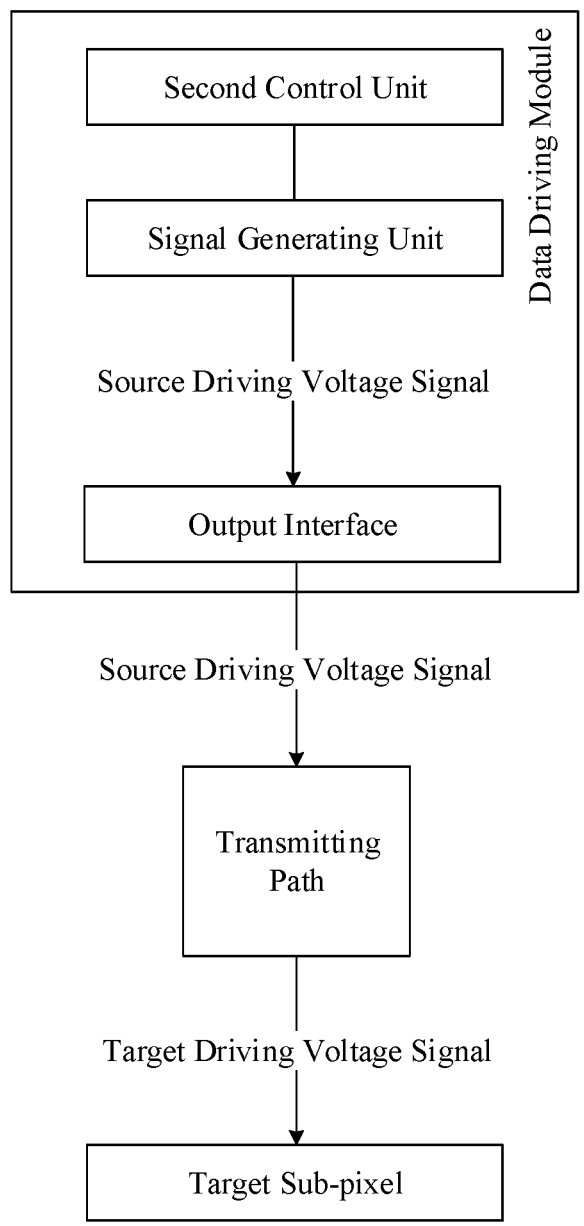
FIG. 6 illustrates a structure schematic view of a data driving module according to at least one embodiment of the present disclosure.

In at least one embodiment of the present disclosure, it is possible to ensure that the source driving voltage signal has a desired driving ability after passing through the transmitting path by controlling a signal amplitude. As illustrated in FIG. 6, the data driving module according to a third embodiment of the present disclosure includes:

a signal generating unit, configured to generate the source driving voltage signal; and a second control unit, configured to control the signal generating unit, such that the source driving voltage signal has a signal amplitude equal to a sum value of an amplitude of the target driving voltage signal and a compensation value, the source driving voltage signal has a preset signal width, such that it is capable of writing the target driving voltage signal to the target sub-pixel after being transmitted to the target sub-pixel through the transmitting path, to operate the target sub-pixel under the operation gray scale, the difference between the operation gray scale and the target gray scale of the sub-pixel being smaller than the predetermined threshold.

In a particular embodiment of the present disclosure, with respect to a same target gray scale, as the impedance of the signal transmitting path increases, the compensation value increases, and then the signal amplitude of the source driving voltage signal generated by the signal generating unit increases.

While in the present embodiment, the signal generating unit may control the amplitude of the output driving voltage signal according to the gray scale and a gamma reference voltage signal. In the embodiment of the present disclosure, the amplitude of the source driving voltage signal may be controlled by the gray scale and the gamma reference voltage signal, which will be described hereinafter, respectively.

In the case where the amplitude of the source driving voltage signal is controlled by the gamma reference voltage signal, the second control unit according to the embodiment of the present disclosure in particular includes:

a first gray scale control unit, configured to adjust the target gray scale and output an adjusted target gray scale to the signal generating unit; and a first gamma reference signal generating unit, configured to output a preset gamma reference voltage signal to the signal generating unit, wherein the signal generating unit is particularly configured to generate the source driving voltage signal having the signal amplitude equal to the sum value of the amplitude of the target driving voltage signal and the compensation value according to the adjusted target gray scale and the preset gamma reference voltage signal.

In the existing data driving module, the X bit data driving module actually includes (X+2) bit optional output voltages to achieve various output adjustments. Accordingly, the additional 2 bit output voltage may be used for the above selection of the source driving voltage signal.

While in the case where the amplitude of the source driving voltage signal is controlled by the gray scale, the second control unit according to the embodiment of the present disclosure in particular includes:

a second gray scale control unit, configured to output the target gray scale to the signal generating unit; and a second gamma reference signal generating unit, configured to generate a gamma reference voltage signal corresponding to the impedance of the signal transmitting path, wherein the signal generating unit is particularly configured to generate the source driving voltage signal having the signal amplitude equal to the sum value of the amplitude of the target driving voltage signal and the compensation value according to the target gray scale and the gamma reference voltage signal.

In contrast, since the gamma reference voltage signal may be generated using a voltage generating chip, it is more flexible to control the amplitude of the source driving voltage signal using the gamma reference voltage signal.

According to the above scheme, a gray scale variation is stored for each gray scale of each sub-pixel, or a set of gamma reference voltage signals is stored for each gray scale of each sub-pixel, and thus it is able to optimize the compensation for the impedance difference. However, it requires a large amount of data storage and costs a lot of processing resources to search for the right gray scale variation or the gamma reference voltage signal for the target gray scale of the sub-pixel.

In a particular embodiment of the present disclosure, in order to increase the response speed, it is possible to compensate only the first portion 104 (as illustrated in FIG. 1) of the data signal transmitting line in the fan-out region 102.

In this case, the compensation processing may be performed by grouping the plurality of output interfaces of each data driving module into M interface sets, wherein M is an integer equal to or greater than 2.

It is assumed that a data driving module corresponds to the output interfaces having a total number of N1+N2+N3+N4+N5. Each output interface is connected to the data signal transmitting line in the display region through the data signal transmitting line in the fan-out region, wherein N1, N2, N3, N4, N5 are integers. In this case, the output interfaces are numbered after sequencing the output interfaces in an increased order according to the length of the data signal transmitting line in the fan-out region, and then the output terminals are grouped into the following five sets.

Set 1: 1, 2, . . . , N1, i.e., from No. 1 to No. N1;
Set 2: N1+1, N1+2, . . . , N1+N2, i.e., from No. N1+1 to No. N1+N2;
Set 3: N1+N2+1, N1+N2+2, . . . , N1+N2+N3, i.e., from No. N1+N2+1 to No. N1+N2+N3 ;
Set 4: N1+N2+N3+1, N1+N2+N3+2, . . . , N1+N2+N3+N4, i.e., from No. N1+N2+N3+1 to No. N1+N2+N3+N4;
Set 5: N1+N2+N3+N4+1, N1+N2+N3+N4+2, . . . , N1+N2+N3+N4+N5, i.e., from No. N1+N2+N3+N4+1 to No. N1+N2+N3+N4+N5.

Between any two of the above sets, each output interface belongs to and only to one set, wherein a maximum value of a length of a data signal transmitting line in the fan-out region corresponding to one output interface set is smaller than a minimum value of a length of a data signal transmitting line in the fan-out region corresponding to the other output interface set.

As the portion of the data signal transmitting line in the display region corresponding to each output interface has exactly the same length, between any two of the output interface sets, a maximum value of an impedance of a data signal transmitting line corresponding to one output interface set is smaller than a minimum value of an impedance of a data signal transmitting line corresponding to the other output interface set.

In the present embodiment, in the case of being grouped into the above sets, the second control unit assigns one same signal compensation value for all the output interfaces in a same output interface set under the same target gray scale, and a greater signal compensation value is assigned to the output interface set corresponding to data signal transmitting lines with a higher average impedance (or in other words, the average length of the data signal transmitting lines corresponding to the output interface set), so as to compensate the impedance difference due to the length difference of the data signal transmitting lines in the fan-out region corresponding to the output interface set.

In this case, for each driving module, M sets of the compensation value parameters may be configured as follow:

|  | Set 1 | Set 2 | . . . | Set M |
| --- | --- | --- | --- | --- |
| Gray scale 0 | Δ10 | Δ20 | . . . | ΔM0 |
| Gray scale 1 | Δ11 | Δ21 | . . . | Δ M 1 |
| . . . | . . . | . . . | . . . | . . . |
| Gray scale L | Δ1M | Δ2M | . . . | Δ M M |
| . . . | . . . | . . . | . . . | . . . |

In an actual display process, after a sub-pixel is selected, it is possible to determine the output interface set corresponding to the column in which the sub-pixel is positioned, and to retrieve the compensation value of the gray scale corresponding to the output interface set, thereby compensating the initial signal and obtaining the source driving voltage signal.

The above compensation value may be previously obtained according to currently available measuring methods, which will not repeated herein.

In a particular embodiment of the present disclosure, when the output interfaces are grouped into M sets, the second gamma reference signal generating unit and the signal generating unit may cooperate in the following two schemes.

Scheme 1

Figure 7:
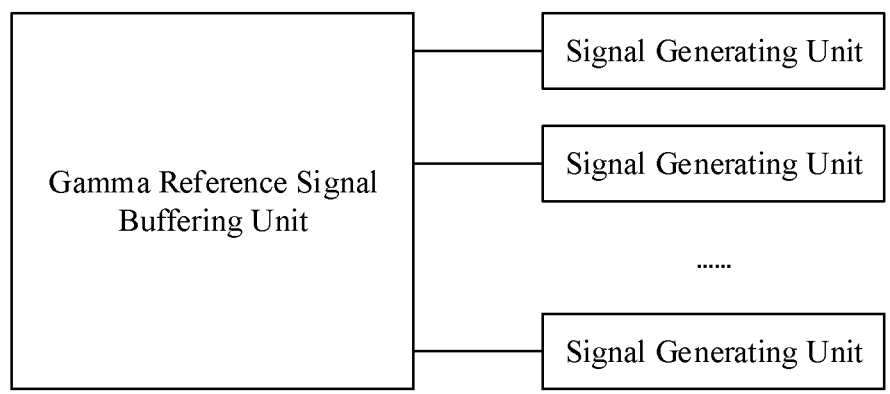
FIG. 7 illustrates a structure schematic view of a gamma reference signal buffering unit and a signal generating unit according to at least one embodiment of the present disclosure.

In scheme 1, as illustrated in FIG. 7, it may be implemented by one gamma reference signal buffering unit. M signal generating units share a common gamma reference signal buffering unit. All the signal generating units retrieve a corresponding gamma reference signal from the gamma reference signal buffering unit.

Scheme 2

Figure 8:
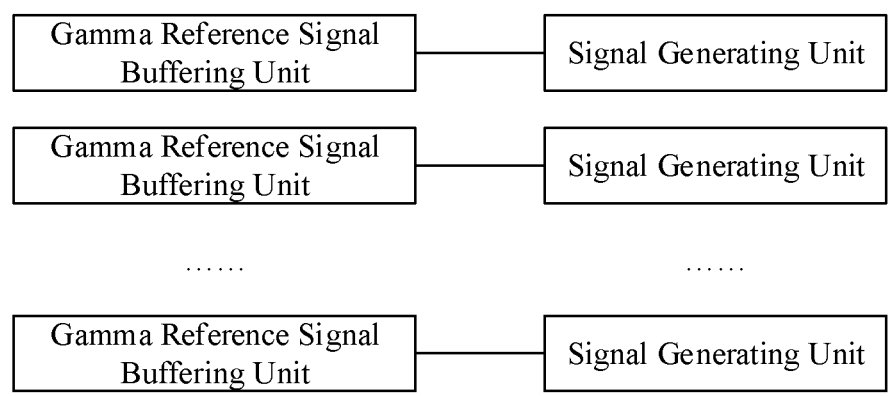
FIG. 8 illustrates another structure schematic view of a gamma reference signal buffering unit and a signal generating unit according to at least one embodiment of the present disclosure.

In scheme 2, as illustrated in FIG. 8, it may be implemented by gamma reference signal buffering units and signal generating units in one to one correspondence. That is, each signal generating unit may independently has a gamma reference signal buffering unit. The signal generating unit may retrieve a corresponding gamma reference signal from respective gamma reference signal buffering units.

While in a particular embodiment of the present disclosure, regardless of controlling the V (i.e., the signal amplitude) or T (i.e., the pulse width) of the source driving voltage signal, when the data driving module includes a plurality of data driving modules, each data driving module may be configured independently according to the above schemes, such that display abnormality within the region managed by the data driving module may be compensated. Also, it is possible to compensate the display abnormality within the region of the liquid crystal panel by comprehensively considering the data driving modules.

Embodiments of the present disclosure further provide a display device, including the above data driving modules.

Figure 9:
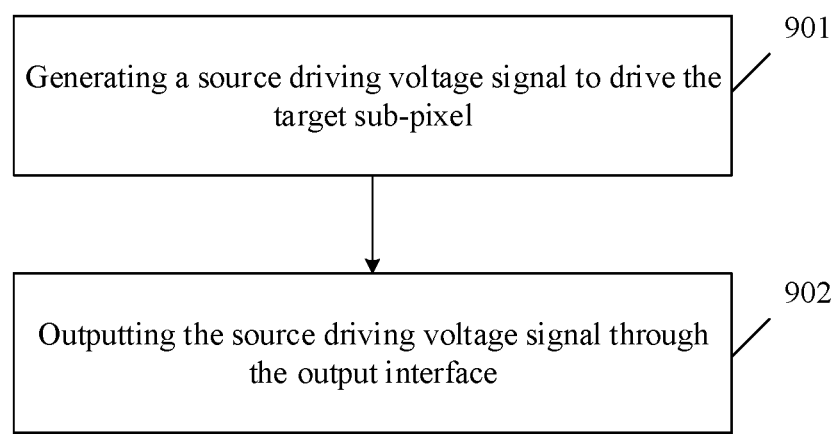
FIG. 9 illustrates a schematic flow chart of a data driving method according to at least one embodiment of the present disclosure.

Embodiments of the present disclosure further provide a data driving method for driving a display panel including a data driving module, the data driving module includes at least one output interface, wherein the output interface is connected to a sub-pixel in the display panel through a data signal transmitting line. As illustrated in FIG. 9, the data driving method includes:

a driving signal generating step 901, configured to generate a source driving voltage signal for driving a target sub-pixel, the source driving voltage signal being capable of writing a target driving voltage signal to the target sub-pixel after being transmitted to the target sub-pixel through a transmitting path, to operate the target sub-pixel under an operation gray scale, a difference between the operation gray scale and a target gray scale of the sub-pixel being smaller than a predetermined threshold; and an output step 902, configured to output the source driving voltage signal through the output interface.

In a particular embodiment of the present disclosure, while generating a source driving voltage signal, the transmitting path between the respective different output interfaces of each sub-pixel and the sub-pixel may be taken into consideration, such that the generated driving voltage signal is capable of allowing the target sub-pixel to operate under the operation gray scale while being transmitted to the target sub-pixel through the transmitting path having an impedance, thereby improving the display abnormality between the sub-pixels due to the impedance difference between the paths.

In the above data driving method, the driving signal generating step in particular includes:

controlling a signal generating unit, such that the source driving voltage signal generated by the signal generating unit has a signal amplitude equal to that of the target driving voltage signal, and a signal width of the source driving voltage signal matches the transmitting path, such that it is capable of writing the target driving voltage signal to the target sub-pixel after being transmitted to the target sub-pixel through the transmitting path, to operate the target sub-pixel under the operation gray scale, the difference between the operation gray scale and the target gray scale of the sub-pixel being smaller than the predetermined threshold.

In the above data driving method, the driving signal generating step in particular includes:

controlling a signal generating unit, such that the source driving voltage signal generated by the signal generating unit has a signal amplitude equal to a sum value of an amplitude of the target driving voltage signal and a compensation value, and a signal width of the source driving voltage signal is a preset value, such that it is capable of writing the target driving voltage signal to the target sub-pixel after being transmitted to the target sub-pixel through the transmitting path, to operate the target sub-pixel under the operation gray scale, the difference between the operation gray scale and the target gray scale of the sub-pixel being smaller than the predetermined threshold.

In the embodiments of the present disclosure, the modules may be implemented by software, such that it may be implemented using various processors. For example, an identified executable code module may include one or more physical or logical blocks of computer instructions, which may, for example, be constructed as objects, processes, or functions. In spite of this, the executable codes of the identified module need not be physically located together, but may include different instructions stored in different locations, which, when logically combined, constitute the module and implement the specified purpose of the module.

In practice, the executable code module may be a single instruction or a plurality of instructions, and may even be distributed over a plurality of different code segments, distributed among different programs, and distributed across multiple memory devices. Likewise, the operational data may be identified within the module and may be implemented in any suitable form and organized within any suitable type of data structure. The operational data may be collected as a single data set or may be distributed on different locations (including on different storage devices) and may at least partially exist only as electronic signals over the system or network.

All of the modules that can be implemented in software can be configured by those skilled in the art to implement corresponding functions by constructing corresponding hardware circuits including conventional very-large scale integrated (VLSI) circuits or gate arrays, as well as existing semiconductors or other discrete components such as logic chips, transistors, and the like. Modules can also be implemented with programmable hardware devices such as field programmable gate arrays, programmable array logic, programmable logic devices, and the like.

Obviously, various changes and modifications can be made in this disclosure by those skilled in the art without departing from the spirit and scope of the disclosure. In this way, the present disclosure is intended to include such variations and variations if these modifications and variations of this disclosure fall within the scope of the present disclosure and the equivalents thereof.

What is claimed is:

1. A data driving module for driving a display panel, comprising:
    at least an output interface, connected to a sub-pixel in the display panel through a data signal transmitting line,
    a driving signal generating module, configured to generate a source driving voltage signal for driving a target sub-pixel, the source driving voltage signal being configured to write a target driving voltage signal to the target sub-pixel after being transmitted to the target sub-pixel through a transmitting path, to operate the target sub-pixel under an operation gray scale, a difference between the operation gray scale and a target gray scale of the sub-pixel being smaller than a predetermined threshold; and
    the at least one output interface, configured to receive and output the source driving voltage signal generated by the driving signal generating module,
    wherein the driving signal generating module comprises:
    a signal generating unit, configured to generate the source driving voltage signal; and a first control unit, configured to control the signal generating unit such that the source driving voltage signal has a signal amplitude equal to that of the target driving voltage signal, and a signal width of the source driving voltage signal matches the transmitting path, such that it is capable of writing the target driving voltage signal to the target sub-pixel after being transmitted to the target sub-pixel through the transmitting path, to operate the target sub-pixel under the operation gray scale, the difference between the operation gray scale and the target gray scale of the target sub-pixel being smaller than the predetermined threshold.

2. The data driving module according to claim 1, wherein the first control unit comprises:
a timing control signal generating unit, configured to generate a timing control signal corresponding to an impedance of the transmitting path, and output the timing control signal to the signal generating unit,
wherein the signal generating unit generates the source driving voltage signal using the timing control signal, and the signal width of the source driving voltage signal matches the transmitting path.

3. The data driving module according to claim 2, wherein the timing control signal comprises a high level signal continuing for a first time and an adjacent low level signal continuing for a second time, a sum value of the first time and the second time is a constant value, and the timing control signal generating unit adjusts a ratio between the first time and the second time according to the impedance of the signal transmitting path and generates the timing control signal corresponding to the impedance of the transmitting path.

4. The data driving module according to claim 1, wherein when the output interface comprises a plurality of output interfaces, the plurality of output interfaces is grouped into M output interface sets, M being an integer equal to or greater than 2, and each output interface belonging to and only to one set, wherein between any two output interface sets, a maximum value of a length of a data signal transmitting line in a fan-out region corresponding to one output interface set is smaller than a minimum value of a length of a data signal transmitting line in the fan-out region corresponding to the other output interface set, the first control unit assigns one same signal width for all the output interfaces in a same output interface set, and a greater signal width is assigned to the output interfaces in the output interface set corresponding to data signal transmitting lines with a longer average length.

5. A data driving module for driving a display panel, comprising:
at least an output interface, connected to a sub-pixel in the display panel through a data signal transmitting line,
a driving signal generating module, configured to generate a source driving voltage signal for driving a target sub-pixel, the source driving voltage signal being configured to write a target driving voltage signal to the target sub-pixel after being transmitted to the target sub-pixel through a transmitting path, to operate the target sub-pixel under an operation gray scale, a difference between the operation gray scale and a target gray scale of the sub-pixel being smaller than a predetermined threshold; and
the at least one output interface, configured to receive and output the source driving voltage signal generated by the driving signal generating module,
wherein the driving signal generating module comprises:

a signal generating unit, configured to generate the source driving voltage signal; and
a second control unit, configured to control the signal generating unit, such that the source driving voltage signal has a signal amplitude equal to a sum value of an amplitude of the target driving voltage signal and a compensation value, the source driving voltage signal has a preset signal width, such that it is capable of writing the target driving voltage signal to the target sub-pixel after being transmitted to the target sub-pixel through the transmitting path, to operate the target sub-pixel under the operation gray scale, the difference between the operation gray scale and the target gray scale of the target sub-pixel being smaller than the predetermined threshold.

6. The data driving module according to claim 5, wherein the second control unit comprises:
a first gray scale control unit, configured to adjust the target gray scale and output an adjusted target gray scale to the signal generating unit; and
a first gamma reference signal generating unit, configured to output a preset gamma reference voltage signal to the signal generating unit,
wherein the signal generating unit is configured to generate the source driving voltage signal having the signal amplitude equal to the sum value of the amplitude of the target driving voltage signal and the compensation value according to the adjusted target gray scale and the preset gamma reference voltage signal.

7. The data driving module according to claim 5, wherein the second control unit comprises:
a second gray scale control unit, configured to output the target gray scale to the signal generating unit; and
a second gamma reference signal generating unit, configured to generate a gamma reference voltage signal corresponding to the impedance of the signal transmitting path,
wherein the signal generating unit is configured to generate the source driving voltage signal having the signal amplitude equal to the sum value of the amplitude of the target driving voltage signal and the compensation value according to the target gray scale and the gamma reference voltage signal.

8. The data driving module according to claim 5, wherein when the output interface comprises a plurality of output interfaces, the plurality of output interfaces is grouped into M output interface sets, M being an integer equal to or greater than 2, and each output interface belonging to and only to one set, wherein between any two output interface sets, a maximum value of a length of a data signal transmitting line in a fan-out region corresponding to one output interface set is smaller than a minimum value of a length of a data signal transmitting line in the fan-out region corresponding to the other output interface set, the second control unit assigns one same compensation value under the same target gray scale for all the output interfaces in a same output interface set, and a greater absolute value of the compensation value is assigned to the output interfaces in the output interface set corresponding to data signal transmitting lines with a longer average length.

9. The data driving module according to claim 7, wherein the gamma reference voltage signal is generated using a voltage generating chip.

10. A display device, comprising the data driving modules according to claim 1.

11. A data driving method for driving the display panel according to claim 1, the data driving method comprising:

a driving signal generating step, configured to generate a source driving voltage signal for driving a target sub-pixel, the source driving voltage signal being configured to write a target driving voltage signal to the target sub-pixel after being transmitted to the target sub-pixel through a transmitting path, to operate the target sub-pixel under an operation gray scale, a difference between the operation gray scale and a target gray scale of the sub-pixel being smaller than a predetermined threshold; and an output step, configured to output the source driving voltage signal through the at least one output interface, wherein the driving signal generating step comprises:

controlling a signal generating unit, such that the source driving voltage signal generated by the signal generating unit has a signal amplitude equal to that of the target driving voltage signal, and a signal width of the source driving voltage signal matches the transmitting path, such that it is capable of writing the target driving voltage signal to the target sub-pixel after being transmitted to the target sub-pixel through the transmitting path, to operate the target sub-pixel under the operation gray scale, the difference between the operation gray scale and the target gray scale of the target sub-pixel being smaller than the predetermined threshold.

12. The data driving method according to claim 11, wherein the timing control signal generating unit generates a timing control signal corresponding to an impedance of the transmitting path, and outputs the timing control signal to the signal generating unit; and the signal generating unit generates the source driving voltage signal having the signal width matching the transmitting path using the timing control signal.

13. The data driving method according to claim 12, wherein the timing control signal comprises a high level signal continuing for a first time and an adjacent low level signal continuing for a second time, a sum value of the first time and the second time is a constant value, and the timing control signal generating unit adjusts a ratio between the first time and the second time according to the impedance of the signal transmitting path and generates the timing control signal corresponding to the impedance of the transmitting path.

14. The data driving method according to claim 11, wherein when the output interface comprises a plurality of output interfaces, the plurality of output interfaces is grouped into M output interface sets, M being an integer equal to or greater than 2, and each output interface belonging to and only to one set, wherein between any two output interface sets, a maximum value of a length of a data signal transmitting line in a fan-out region corresponding to one output interface set is smaller than a minimum value of a length of a data signal transmitting line in the fan-out region corresponding to the other output interface set, the first control unit assigns one same signal width for all the output interfaces in a same output interface set, and a greater signal width is assigned to the output interfaces in the output interface set corresponding to data signal transmitting lines with longer average length.

15. A data driving method for driving the display panel according to claim 1, the data driving method comprising:

a driving signal generating step, configured to generate a source driving voltage signal for driving a target sub-pixel, the source driving voltage signal being configured to write a target driving voltage signal to the target sub-pixel after being transmitted to the target sub-pixel through a transmitting path, to operate the target sub-pixel under an operation gray scale, a difference between the operation gray scale and a target gray scale of the sub-pixel being smaller than a predetermined threshold; and an output step, configured to output the source driving voltage signal through the at least one output interface, wherein the driving signal generating step comprises:

controlling a signal generating unit, such that the source driving voltage signal generated by the signal generating unit has a signal amplitude equal to a sum value of an amplitude of the target driving voltage signal and a compensation value, and a signal width of the source driving voltage signal is a preset value, such that it is capable of writing the target driving voltage signal to the target sub-pixel after being transmitted to the target sub-pixel through the transmitting path, to operate the target sub-pixel under the operation gray scale, the difference between the operation gray scale and the target gray scale of the target sub-pixel being smaller than the predetermined threshold.

16. The data driving method according to claim 15, further comprising:

adjusting the target gray scale, and outputting the adjusted target gray scale to the signal generating unit;

outputting a preset gamma reference voltage signal to the signal generating unit; and generating, by the signal generating unit, the source driving voltage signal having the signal amplitude equal to the sum value of the amplitude of the target driving voltage signal and the compensation value, according to the adjusted target gray scale and the preset gamma reference voltage signal.

17. The data driving method according to claim 15, further comprising:

outputting the target gray scale to the signal generating unit;

generating a gamma reference voltage signal that matches the impedance of the signal transmitting path; and generating, by the signal generating unit, the source driving voltage signal having the signal amplitude equal to the sum value of the amplitude of the target driving voltage signal and the compensation value, according to the target gray scale and the gamma reference voltage signal.

18. The data driving method according to claim 15, wherein when the output interface comprises a plurality of output interfaces, the plurality of output interfaces is grouped into M output interface sets, M being an integer equal to or greater than 2, and each output interface belonging to and only to one set, wherein between any two output interface sets, a maximum value of a length of a data signal transmitting line in a fan-out region corresponding to one output interface set is smaller than a minimum value of a length of a data signal transmitting line in the fan-out region corresponding to the other output interface set, the second control unit assigns one same compensation value under the same target gray scale for all the output interfaces in a same output interface set, and a greater absolute value of the compensation value is assigned to the output interfaces in the output interface set corresponding to data signal transmitting lines with a longer average length.

* * * * *